United States Patent [19]

Austin

[11] 4,010,342

[45] Mar. 1, 1977

[54] INDUCTION COOKING APPLIANCE HAVING IMPROVED PROTECTION CIRCUITS

[75] Inventor: Buddy Julian Austin, Lafayette, Ind.

[73] Assignee: Roper Corporation, Kankakee, Ill.

[22] Filed: Oct. 29, 1974

[21] Appl. No.: 518,772

[52] U.S. Cl. .................... 219/10.49; 219/10.77; 321/14
[51] Int. Cl.² .......................................... H05B 5/04
[58] Field of Search ......... 219/10.49, 10.77, 10.75, 219/131 R; 321/11, 14, 16, 18

[56] References Cited

UNITED STATES PATENTS

| | | | |
|---|---|---|---|
| 3,742,173 | 6/1973 | Kornrumpf et al. | 219/10.77 |
| 3,770,928 | 11/1973 | Kornrumpf et al. | 219/10.49 |
| 3,786,219 | 1/1974 | Kornrumpf et al. | 219/10.49 |
| 3,806,688 | 4/1974 | MacKenzie et al. | 219/10.77 |
| 3,823,297 | 7/1974 | Cunningham | 219/10.77 |
| 3,886,342 | 5/1975 | Peters | 219/10.77 |

Primary Examiner—Bruce A. Reynolds
Attorney, Agent, or Firm—Leydig, Voit, Osann, Mayer & Holt, Ltd.

[57] ABSTRACT

An induction cooking appliance for heating a metallic utensil by means of an ultrasonic frequency magnetic field. The appliance includes a smooth, substantially non-metallic cooktop for supporting the utensil, and a work coil mounted below the cooktop for coupling the magnetic field to the utensil. The work coil is arranged in a solid state inverter circuit, including a gate controlled thyristor and a commutating capacitor, arranged to convert a d.c. voltage to current pulses of ultrasonic frequency. Simplified inverter protection circuits assure that conditions within the inverter do not exceed the component ratings. The protection circuits include a load sensing circuit for disabling the inverter when unloaded or when improperly loaded. An associated circuit responds to the power operating level of the inverter for varying the sensitivity of the load sensing circuit. Further protection is provided by an over-voltage limit circuit also adapted to disable the inverter. Means are provided for limiting potentially damaging voltage transients which may be generated when the inverter is disabled by the load sensing circuit. User convenience is enhanced by providing, in combination with the on/off inverter operation, a pilot light circuit which operates from a low voltage supply but responds to a small portion of the energy tapped from the inverter ciruit so as to be illuminated only when the inverter is actually operating.

25 Claims, 8 Drawing Figures

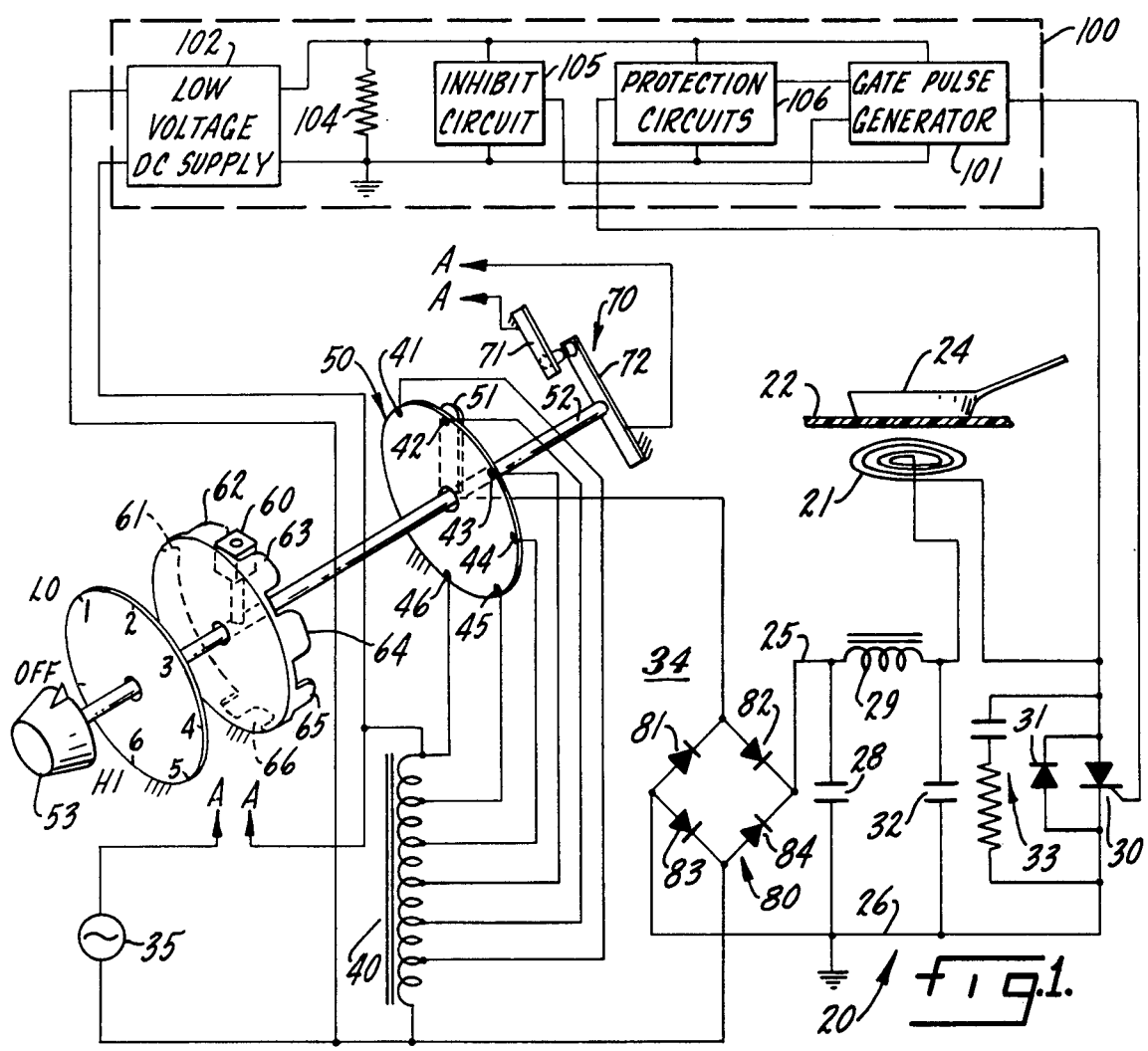
fig.1.
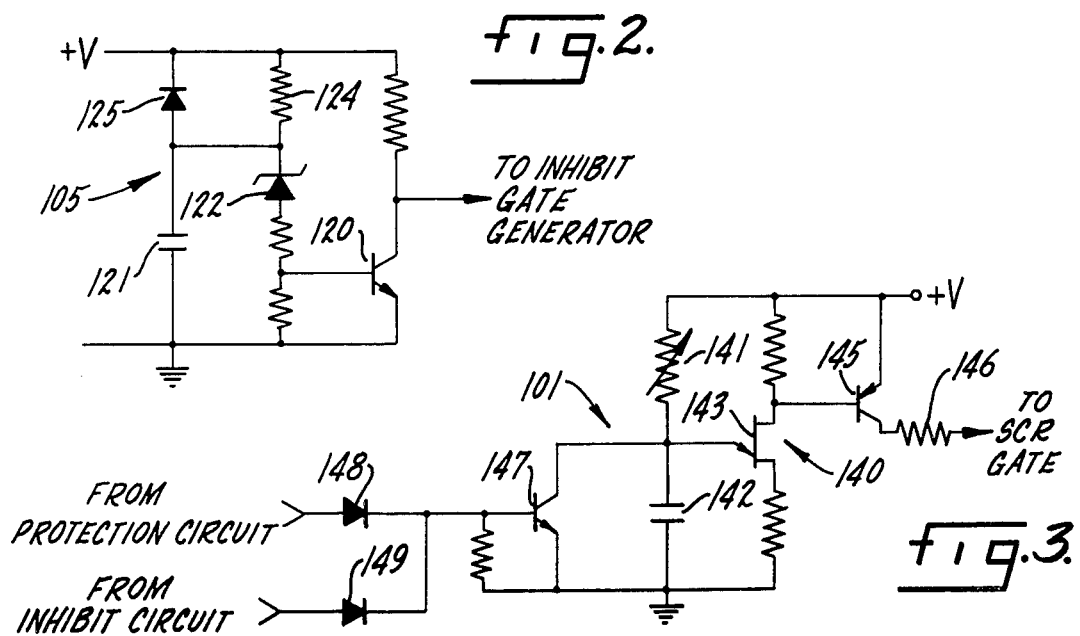
fig.2.
fig.3.

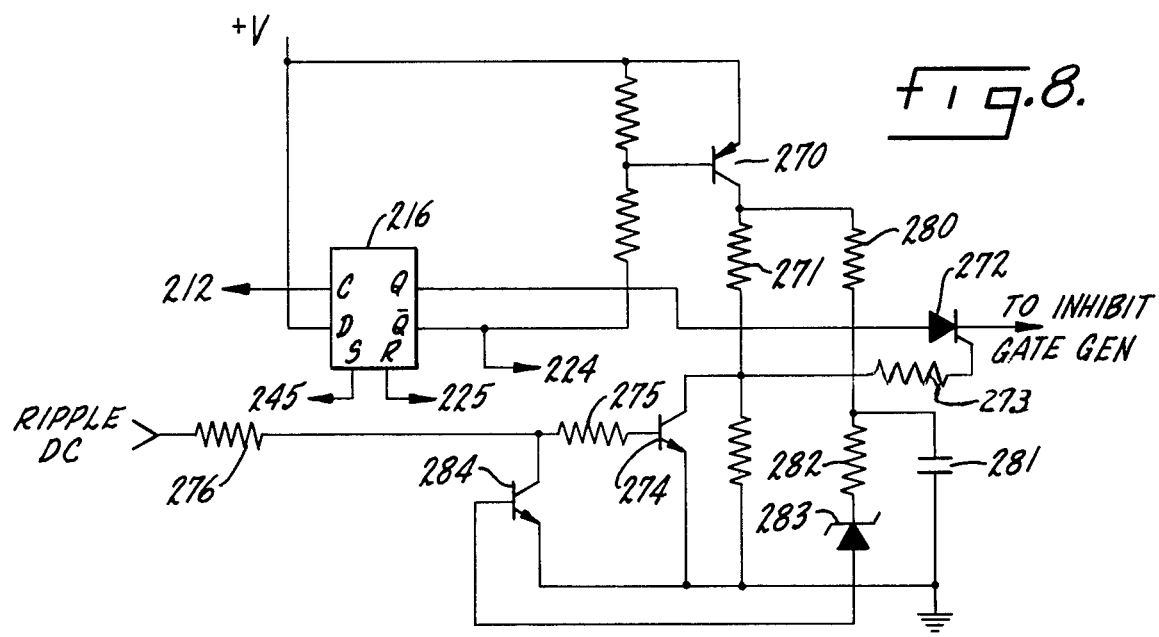

INDUCTION COOKING APPLIANCE HAVING IMPROVED PROTECTION CIRCUITS

This invention relates to induction cooking appliances, and more specifically to improved protection circuits for use therewith, adapted to protect both the user and the appliance circuitry.

Cooking appliances utilizing solid state inverters operated at ultrasonic frequencies for producing an alternating magnetic field capable of generating heat in a metallic utensil are known. The inverter circuits most commonly found in these appliances generally include an SCR, an inversely poled parallel diode, a work coil and a commutating capacitor. Triggering of the SCR initiates a bidirectional resonant exchange of energy between the capacitor and coil followed by a recharge period before the SCR is again triggered.

While internally complex, such appliances possess several user oriented advantages not available in other known cooking appliances. Since heat is generated directly in the utensil, and applied directly to the food, the high temperatures used in conventional gas and electric burners do not occur. As a result, the cooktop remains relatively cool, and spilled foods cannot burn or char. As a corollary to the above advantage, the amount of waste heat given off to the kitchen is minimized. Finally, induction cooking systems are characterized by low thermal mass, allowing quick response to changes in heat settings.

A major disadvantage associated with presently known induction cooking appliances as described in prior patents is their complexity and the resulting high cost of purchase. A second consideration is reliability, a factor which can be easily appreciated by comparing the number of electronic components in an induction cooking system to the relatively straightforward conventional electric or gas units. It will, therefore, be apparent that the acceptance of induction cooking by the consuming public is dependent in large part upon the provision of adequate circuitry, economically achieved, to drastically limit the failure rate of the electronic components within the appliance. The importance of a simplified protection circuit is further emphasized by economic constraints, which require utilization of power components not excessively overrated, in conjunction with an uncomplicated, easily fabricated circuit for restraining conditions to within those ratings.

It should be noted at this point that protection circuits are necessitated in large part because of the unpredictability of the nature of the load (the utensil disposed over the work coil) which might be presented to the inverter. The work coil, in which bidirectional current pulses are produced at an ultrasonic frequency by the inverter, acts as a transformer primary for coupling the magnetic field to the utensil load. The utensil itself acts as a single turn shorted secondary, withdrawing energy from the magnetic field to be heated thereby. A proper load for the inverter may be considered to be a utensil of lossy metal, such as iron, steel, stainless steel or laminated combinations of the above. By way of contrast, an improper load may be considered to be a utensil of highly conductive metal such as copper or aluminum, or small metallic objects such as rings, watches, knives, forks, etc. A no load condition may be considered to be an inverter operating in the absence of a metallic object disposed over the work coil. In a properly loaded inverter, the utensil serves to withdraw considerable energy during each conductive cycle, limiting circuit currents and voltages to levels within the device ratings. However, when unloaded or improperly loaded, little energy is extracted, causing the resonant energy exchange to generate voltages and/or currents which might prevent commutation of the SCR or otherwise prove destructive to the circuit elements.

Several examples of presently known induction cooking systems, while not covering all possible protection techniques, will serve to illustrate the relatively complex approaches to the problem adopted heretofore.

A first known approach to protecting the components within an induction cooking inverter, as illustrated in U.S. Pat. No. 3,710,062 to Peters, includes a relatively complex thyristor gating circuit for precisely establishing the recharge period between conductive cycles of the inverter, thereby to cause the reapplied forward voltage across the thyristor to be insensitive to the loaded or unloaded condition of the work coil. However, it was found that that approach was incapable of protecting the inverter when loaded with a highly conductive utensil. Accordingly, a second circuit, as illustrated in U.S. Pat. No. 3,775,577 to Peters, was included in the appliance based upon establishing a pedestal of predetermined length initiated by the start of a conductive cycle, and assuring that commutation occurred within the period set by the pedestal.

Other known cooking appliances, as illustrated in prior patents, (e.g. U.S. Pat. Nos. 3,781,505 and 3,820,005 to Steigerwald) have attempted to protect the inverter by utilizing constant duty cycle controls for measuring the conductive interval of the inverter and adjusting the length of the recharge period to maintain an approximately constant duty cycle. As such controls increase the operating frequency in response to a decreased conductive interval (as is normally caused by loading of the inverter), they are not particularly suited to protecting the inverter from improper loads. In certain instances, presenting a highly conductive utensil to the work coil causes a substantially shortened conductive interval which, in turn, would cause the constant duty cycle control to raise the operating frequency even higher, thus further aggravating the situation.

It has been recognized (e.g. in U.S. Pat. Nos. 3,770,928 and 3,786,219 to Kornrumpf et al) that the magnitude of the forward voltage reapplied across the thyristor after commutation is a useful indicator of operating conditions within an inverter. Accordingly, an induction cooking appliance has been suggested wherein a sensing circuit is enabled for a brief period at about the termination of a conductive cycle to sense the voltage level reapplied across the thyristor. This protective circuit, which is intended to indirectly sense an unloaded work coil, is generally utilized to reduce the operating frequency of a gate pulse generator, thereby to reduce the average power produced by the inverter and limit the level of the reapplied voltage. The noted protection circuit is complicated by timing elements for enabling the circuit during the brief period when forward voltage is reapplied, and disabling it at all other times to prevent the circuit from responding to the gradually rising voltage during the recharge interval. Additionally, as the operating voltages within the inverter (both reapplied and average) are reduced for lower power operating levels, such circuit is effective mainly at high power levels. Accordingly, the overall efficiency of the system is decreased as the inverter is allowed to operate unloaded under certain circumstances. The unit may also serve to heat small metallic objects inadvertently placed on the cooktop, causing a potential user hazard.

With the foregoing in mind, it is a general aim of the present invention to provide an induction cooking appliance having an improved protection circuit, which efficiently and reliably protects the inverter by disabling it in response to abnormal conditions within the inverter circuit. In carrying out that aim, it is an object of the invention to sense the voltage across the gate controlled thyristor as a means for indicating the operating conditions of the inverter. In conjunction with the foregoing aim, it is an additional object to provide automatic operation by periodically re-enabling the inverter thereby to sense if the operating conditions have been corrected.

It is a more specific object of the present invention to provide an induction cooking appliance wherein both an unloaded and an improperly loaded inverter condition is detected utilizing a single simplified sensing circuit. In that regard, it is a further object to adjust the sensitivity of the sensing circuit in accordance with the power operating level of the inverter.

A general object of the invention is to provide an induction cooking appliance wherein high standby losses resulting from unloaded operation of the inverter are eliminated. A related object is to minimize radiated EMI and reduce the required complexity of the work coil shielding by preventing unloaded operation of the inverter. It is an additional object to provide such an appliance with enhanced user safety features, which prevent the heating of small metallic objects disposed over the work coil of an operating inverter.

According to another aspect of the invention, it is an object to provide an induction cooking appliance wherein actual inverter operation is clearly indicated to the user by a simplified low voltage pilot light circuit.

Other objects and advantages will become apparent from the following detailed description, when taken in conjunction with the drawings in which:

FIG. 1 is a schematic diagram illustrating the circuitry of an induction cooking appliance constructed in accordance with the present invention;

FIG. 2 is a schematic diagram illustrating an inhibit circuit;

FIG. 3 is a schematic diagram illustrating a gate pulse generator;

FIG. 8 is a schematic diagram illustrating a zero voltage disabling circuit.

Figure 4:
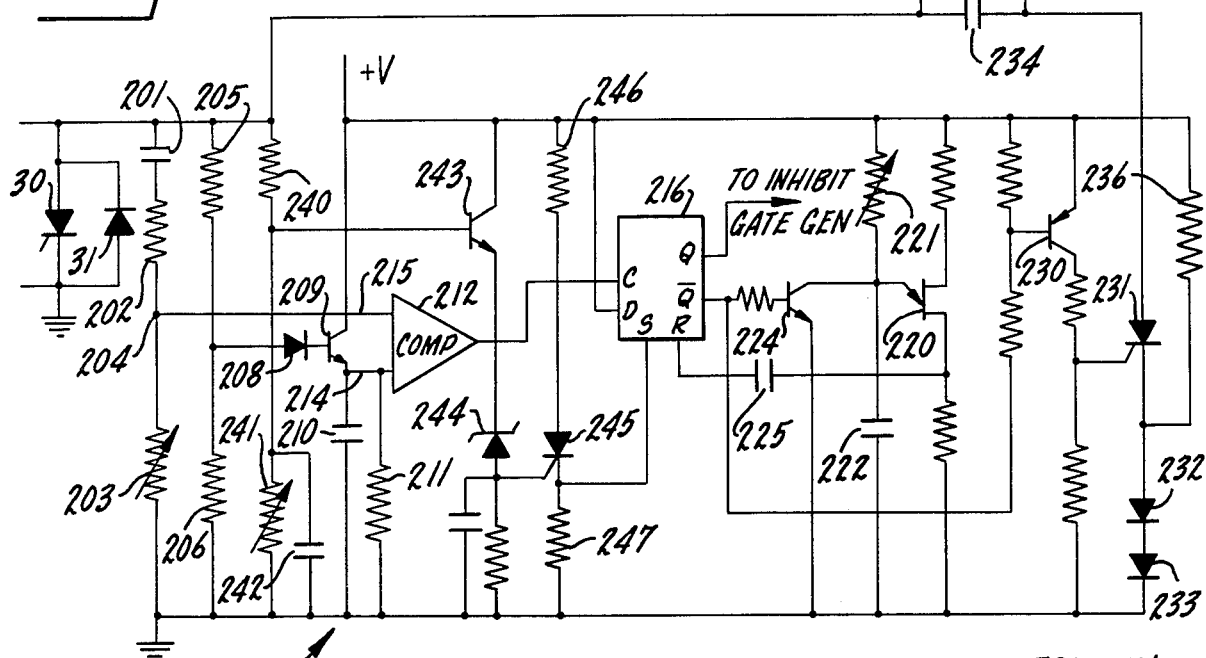
FIG. 4 is a schematic diagram illustrating a protection circuit constructed in accordance with the present invention.

While the invention will be described in connection with a preferred embodiment, it will be understood that there is no intention to limit it to that embodiment. On the contrary, the intent is to cover all alternatives, modifications and equivalents as included within the spirit and scope of the invention as defined by the appended claims.

Turning now to the drawings, and particularly to FIG. 1, there is shown in schematic form the circuitry of an induction cooking appliance embodying the present invention. The appliance includes an inverter circuit generally indicated at 20 for producing an ultrasonic frequency magnetic field. In a known manner, the field is produced by causing bidirectional current pulses in a work coil 21, which is preferably a flat pancake-shaped coil mounted below a substantially non-metallic cooktop surface of the appliance, schematically illustrated at 22. Alined over the coil 21 on the cooktop surface 22 is a metallic utensil 24. In operation, the work coil 21 acts as a primary for generating an ultrasonic frequency magnetic field and coupling the field to the utensil 24 which acts as a single turn shorted secondary, to be heated by the energy contained in the field. The cooktop surface 22 may be formed of a substantially flat continuous sheet for supporting one or more utensils over one or more work coils, the energy which causes the heating being coupled through the cooktop.

The inverter circuit 20 illustrated in FIG. 1 is a known circuit which is particularly suited for use in cooking appliances because of its simplicity. The circuit is powered from a pair of d.c. supply lines 25, 26, and serves to transform the supplied d.c. into ultrasonic frequency current pulses in the work coil 21. A filter capacitor 28 coupled across the d.c. supply lines 25, 26 serves to reduce ripple, while a smoothing inductor 29 coupled between the filter capacitor and a commutating capacitor 32, provides a relatively constant charging current to the commutating capacitor. A high voltage d.c. power supply, generally indicated at 80, is driven from an a.c. power source 35 (typically 120 volts, 60 Hz.) for providing the energizing d.c. potential to lines 25, 26.

For causing the inverter 20 to oscillate, the circuit includes a gate controlled thyristor, shown herein as an SCR 30, with an inversely poled diode 31 coupled across the SCR as shown. In the illustrated inverter, the commutating capacitor 32 is coupled across the filtered d.c. in parallel relationship with the series combination of the work coil 21 and inverse parallel SCR-diode combination 30, 31. A conventional snubber circuit 33 is coupled across the SCR as shown. The SCR 30 has its gate coupled to a gate pulse generator 101 to be described in more detail below. Suffice it to say for the moment that the gate pulse generator produces pulses to trigger the SCR at the operating frequency of the inverter.

For setting the heating levels of the inverter "burner", means are provided for adjusting the amount of energy in the ultrasonic frequency magnetic field. In the illustrated embodiment, power is controlled in an incremental manner utilizing a multi-tapped autotransformer 40 having taps 41–46, operating in conjunction with a selector switch 50. The selector switch 50 is adapted to select individual ones of the taps 41–46 and couple the selected tap to a bridge rectifier 80 comprised of diodes 81–84, thereby to incrementally adjust the voltage level on inverter supply lines 25, 26. As a further feature of the power control means, an on/off switch 70 is responsive to axial movement of the selector switch shaft 52 for disconnecting the a.c. power source 35 from the circuit during power switching operations. It is noted that axial movement of the shaft 52 is necessitated, when switching between taps, by the detent mechanism comprised of cams 61–66 and cam follower 60. For a further description of the power control means, reference may be made to U.S. Pat. application Ser. No. 513,635, filed Oct. 10, 1974 by B.

J. Austin, and assigned to the same assignee as the present invention. It is emphasized, however, that the protection circuits, which form an important element of the present invention, may be applied to inverter circuits utilizing other power control means.

For controlling the operation of the inverter, including triggering of the inverter at the intended ultrasonic operating frequency, a control circuit generally indicated at 100 is provided. The control circuit 100 is powered by a low voltage d.c. supply 102, which is preferably coupled to the a.c. source 35 via the on/off switch 70. In the illustrated arrangement, both the low voltage and high voltage d.c. power supplies are temporarily deenergized when changing inverter power levels. The major elements of the control circuit 100 illustrated in block form in FIG. 1 comprise the gate pulse generator 101 for triggering the SCR at the intended ultrasonic operating frequency, an inhibit circuit 105 for allowing the circuit to stabilize before initiating operation, and protection circuits 106 for assuring that conditions within the inverter circuit do not exceed the device limitations.

Before examining the circuitry of the individual elements of the control circuit 100, the overall operation of the induction cooking appliance will be set forth. To activate the induction cooking appliance, an operator simply adjusts the selector switch 50 utilizing the control knob 53 to select the desired heating level. Selecting one of the heat settings allows the detent mechanism comprised of cams 61–66 and cam follower 60 to fall into place, thereby closing switch 70 to couple the a.c. source to both the high voltage inverter supply and the low voltage control circuit supply. As a result, the filter capacitor 28 begins to charge to the d.c. level established by the selected tap. Current flow through smoothing inductor 29 serves to charge the commutating capacitor 32 to the selected d.c. supply level. Concurrently with the aforementioned action, the low voltage d.c. supply is energized, applying power to the protection circuits, the gate pulse generator and the inhibit circuit. The inhibit circuit is effective to produce a delay signal which is coupled to the gate pulse generator prohibiting the production of gate pulses for the length of the delay period. The length of the period is selected to allow the circuit to stabilize to store sufficient energy in the commutating capacitor, and to assure the production of full power gate pulses by the control circuit. At the termination of the delay period, the gate pulse generator 101 will be enabled to produce trigger pulses at the ultrasonic operating frequency of the inverter.

Coupling of a trigger pulse to the gate of SCR 30 initiates a conductive cycle of the inverter by providing a path to discharge the commutating capacitor 32 through the work coil 21 and the anode-cathode circuit of the SCR. Resonance between the work coil and the commutating capacitor causes continued current flow to charge the capacitor 32 negatively. When the positive current pulse ceases, the commutating capacitor will begin to discharge in the opposite direction through diode 31, causing a reverse current pulse in the work coil 21. During this time, the SCR 30 is commutated to resume its blocking state. Just as in the previous half cycle, the current flow through the work coil 21 continues after capacitor 32 is discharged, to recharge the capacitor in a positive direction. When current flow again ceases, the capacitor will attempt to discharge, but is prevented from doing so as the SCR 30 has resumed its blocking state. Accordingly, the voltage on capacitor 32 is reapplied across the SCR at the instant the diode 31 ceases conducting. Current flow through the smoothing inductor 29 recharges capacitor 32 before the next gate pulse is supplied to the SCR for initiating a subsequent conductive cycle.

Summarizing the inverter operation, it is seen that a trigger pulse provided to the SCR 30 initiates a conductive cycle resulting in the resonant exchange of energy between the commutating capacitor and the work coil. The energy exchange results in a bidirectional current pulse, the first or positive half cycle flowing through the anode-cathode circuit of the SCR, and the second or reverse half cycle flowing through the diode 31. The conductive cycle is followed by a recharge period which is terminated by a subsequent gate pulse to initiate another conductive cycle.

It is well known that the utensil 24 disposed over the work coil 21 serves as the basic inverter load, and is therefore an important factor in determining the voltages and currents in the inverted circuit. Stated simply, the utensil load must be capable of drawing sufficient power from the inverter circuit for the pre-established power setting to maintain inverter circuit conditions within the ratings of the components, especially the semi-conductor elements.

Figure 6:
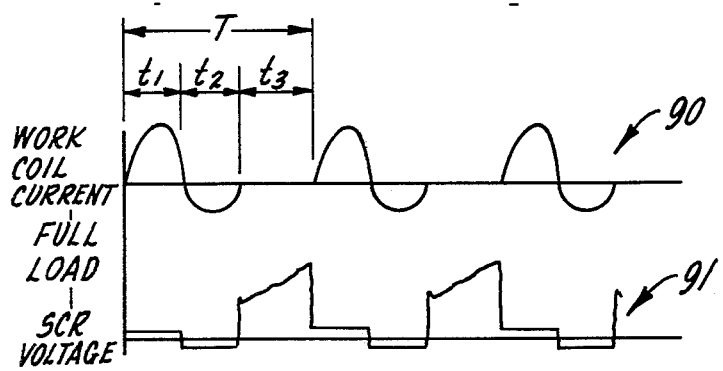
FIGS. 6 and 7 illustrate inverter circuit waveforms for the full load and no load conditions respectively.

Turning now to FIG. 6, the effect of the load on conditions within the inverter circuit will be graphically demonstrated. Illustrated at 90 and 91 are plots of the work coil current and the SCR voltage respectively under conditions when the inverter is properly loaded. An inverter cycle T is comprised of three discernible periods including the period of SCR conduction $t_1$, the period of diode conduction $t_2$ and the recharge period $t_3$. It is seen that the bidirectional current pulses are sinusoidal in nature but are damped as a result of the load presented to the work coil. Because of the power withdrawn by the load, the commutating capacitor is recharged to a voltage which is considerably less than the voltage present on the capacitor at the initiation of the cycle. The voltage across the SCR during the above-described cycle is illustrated at 91 wherein $t_1$ shows the minimal forward voltage drop across the SCR during the positive current pulse, $t_2$ shows the voltage drop across the diode 31 during the negative half cycle (during which time the SCR commutates) and $t_3$ shows the commutating capacitor voltage being instantaneously applied across the SCR when diode 31 ceases conducting followed by the recharging of the capacitor through the smoothing inductor 29.

Figure 7:
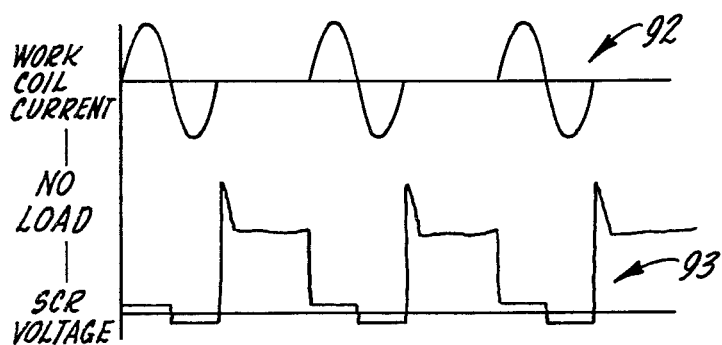

By way of contrast, the corresponding currents and voltages for an unloaded inverter are illustrated in FIG. 7 at 92 and 93 respectively. As shown by plot 92, the bidirectional current pulses are virtually undamped, the negative excursions being almost as large as the positive excursions. As little energy is lost during each conductive cycle, the charge on the commutating capacitor 32 is almost as great at the termination of a conductive cycle as at the initiation thereof. Recalling that the capacitor voltage is applied across the SCR at the instant diode 31 ceases conducting, it is seen that the relatively high reapplied forward voltage causes a considerable voltage overshoot. The conditions illustrated at 93 may be destructive of the circuit components, especially the semi-conductor devices, by exceeding the maximum voltage ratings thereof or the dv/dt ratings of the SCR. While the case of an improperly loaded inverter is not illustrated, such case has the general characteristics of the unloaded inverter in that the load withdraws only minimal energy, complicated by a decreased conductive interval.

For preventing such occurrences, the control circuit 100 includes protection circuits 106 which are adapted to sense conditions within the inverter circuit and disable the gate pulse generator 101 in response to conditions exceeding a predetermined level. Turning now to FIG. 4, the structure of an exemplary protection circuit 106 constructed in accordance with the invention will be described.

Illustrated at the left of FIG. 4 are the SCR 30 and inverse parallel diode 31, which comprise the semiconductor elements of the inverter circuit 20, with the anode of SCR 30 being coupled to the sensing circuits 106 for sensing inverter circuit conditions.

For sensing the magnitude of the forward voltage reapplied across the SCR at the instant the diode 31 ceases conducting (the dv/dt transient), a capacitor 201, a resistor 202 and a variable resistor 203 are serially coupled across the SCR. The value of capacitor 201 is preferably very small so that the circuit differentiates the reapplied forward voltage waveform to respond to the rapidly rising leading edge thereof, while being rather insensitive to the comparatively slower changes resulting from recharging of the commutating capacitor. The value of resistor 203 is adjusted so that the voltage at junctions 204 caused by an excessive transient produces a response in the remaining circuitry, while the voltage caused by an acceptable level change produces no response. It is contemplated that the voltage at junction 204 may be compared to a fixed level in order to maintain conditions within the inverter circuit within the limitations of the semi-conductor devices. However, in accordance with the invention, the transient responsive voltage at junction 204 is compared to a floating level dependent upon the operating power level of the inverter. As will be described in more detail below, this measure not only conserves power and minimizes radiated EMI by disabling the inverter when unloaded, independently of the power setting, but also affords user protection in preventing the heating of relatively small metallic objects.

For establishing a voltage proportional to the power operating level of the inverter circuit, a pair of serially connected resistors 205, 206 are coupled across the SCR with the junction between the resistors being coupled via a diode 208 to the base of a transistor 209. The transistor 209, which has its collector coupled to the positive output of the low voltage d.c. supply, is arranged to peak charge a capacitor 210 in its emitter circuit to a value proportional to the peak anode voltage of the SCR. A relatively large valued resistor 211 is provided for discharging the capacitor 210 so that the voltage at the emitter of transistor 209 may follow the changes in peak anode voltage. The value of capacitor 210 is preferably at least an order of magnitude larger than that of capacitor 201 so that the voltage at the emitter of transistor 209 is proportional to the peak anode voltage but is insensitive to the fast rising transients exceeding the peak. As a result, the capacitor 210 is charged to a voltage proportional to the level of commutating capacitor voltage just before the initiation of a conductive cycle, this voltage being an excellent indicator of the operating power level of the inverter. While this is especially true in the power selection scheme illustrated in FIG. 1 wherein the actual d.c. voltage supplied to the inverter is varied to adjust power, the technique may be used with other power control means, such as variable frequency gate pulse generators, which also cause the peak anode voltage to increase with increasing power settings.

For comparing the voltage detected by the dv/dt transient sensing means to the voltage on capacitor 210, a comparator 212 is provided having an input 214 coupled to the capacitor 210 and an input 215 coupled to the junction 204. In operation, the voltage at comparator input 215 rises briefly at the termination of each conductive cycle to a level dependent upon the magnitude of the reapplied voltage, including any overshoot transient. The voltage at comparator input 214 is floating at a d.c. level proportional to the peak anode voltage (exclusive of any transient). If the transient responsive voltage exceeds the floating d.c. level, the output of the comparator will switch from a low to a high level thereby triggering a flip-flop 216. The flip-flop 216, which is normally maintained in its reset state, and has its data input coupled to the positive d.c. supply, will respond by driving its Q output from a low to a high level.

In practicing the invention, the Q output of flip-flop 216 is coupled to the inhibit input of the gate pulse generator 101, and serves to disable the gate generator when driven to a high level. Accordingly, sensing of a transient which exceeds a voltage level proportional to the inverter power output causes the disabling of the gate generator to disable inverter operation.

According to one feature of the invention, means may be provided for periodically re-enabling the gate pulse generator to sense for the application of a proper load. To that end, a checking oscillator is provided comprised of unijunction transistor (UJT) 220 and its ancillary components including timing resistor 221 and timing capacitor 222. A clamping transistor 224 is arranged as a common emitter switch to prevent the charging of capacitor 222 whenever the flip-flop 215 is in it normal reset state. However, when the comparator senses an improper load and clocks the flip-flop 216, base drive is removed from transistor 224 thereby energizing the checking oscillator circuit. At the termination of the timing period of the checking oscillator, which may for example be set at approximately three seconds, a brief positive pulse is coupled through the capacitor 225 to the reset input of the flip-flop 216. Accordingly, the Q output of the flip-flop is again driven to a low level, thereby re-enabling the gate pulse generator and disabling the checking oscillator. If the inverter is still improperly loaded, the comparator acting through its sensing circuits will again detect such improper load and will clock the flip-flop to again bring it to its set condition disabling the gate pulse generator. This cycle is continued until power is removed from the inverter, or a proper load applied.

The above described checking circuit is a decided operational advantage from a user's standpoint, in that when a proper load is presented to the inverter work coil, cooking will commence without further action by the user. This is especially significant in a circuit designed to be disabled when improperly loaded at any operating power level. It will be appreciated that the checking circuit, which causes the re-energization of the inverter for only a fraction of a millisecond if the inverter is not properly loaded, causes the dissipation of only minimal power, and insignificant heating in any small objects presented to the work coil. If desired, however, the checking circuit may be dispensed with and replaced with a push-to-start switch for resetting the flip-flop 216. Such a manual system might, in certain circumstances, be considered an additional safety feature, since the inverter would not start until the user placed a utensil over the work coil, then pushed the start button.

In addition to disabling the gate pulse generator to prevent the initiation of conductive cycles when the inverter is improperly loaded, means are provided for limiting the potentially damaging transients which might be associated with such an occurrence. A first approach to this problem contemplates the actual dissipation of the energy within the cycle which caused the activation of the load sensing circuit. Accordingly, a clamp circuit is provided responsive to the output of the flip-flop 216 for dissipating the energy which might otherwise be imposed across the SCR and reverse parallel diode. One embodiment of such clamp circuit is illustrated at the right of FIG. 4, including a transistor 230 responsive to the $\overline{Q}$ output of flip-flop 216 for providing a trigger signal to a clamping SCR 231. The cathode of SCR 231 is coupled through a pair a biasing diodes 232, 233 to circuit common, while the anode is coupled via a relatively large value capacitor 234 to the anode of SCR 30. A discharge resistor 235 is connected across the capacitor 234.

In operation, when the comparator 212 detects an improper load and clocks flip-flop 216, the $\overline{Q}$ output thereof is driven to a low level, causing transistor 230 to conduct and thereby to turn on SCR 231. The relatively large value capacitor 234 is thus imposed across the main power SCR 30 to limit the voltage magnitude in the inverter circuit. In short, the capacitor 234 may be considered to be a very large snubber capacitor which is switched into operative relationship across the SCR under predetermined conditions. The diodes 232, 233 act in conjunction with a resistor 236 for biasing the cathode of SCR 231 to assure commutation.

It is also contemplated that a simplified clamp circuit may be constructed using voltage responsive devices such as zener diodes or varistors. Such a circuit may be arranged to limit transients to acceptable levels, while eliminating the need for a trigger signal from the load sensing circuit.

Turning now to FIG. 8, there is illustrated an alternative means for limiting transients which may be generated when the inverter is shut down in response to the activation of the utensil presence detection circuit. In contrast to the clamp circuit which limits transients by actually absorbing energy, the circuit illustrated in FIG. 8 is adapted to limit transients by shutting down the inverter at times when energy within the inverter is at a minimum.

It will be appreciated that the d.c. voltage supply for the inverter comprising the full wave bridge and filter capacitor has a high ripple factor. As a result, the forward voltage reapplied across the inverter for any given load is not constant, but varies at a 120 Hz rate. It is the function of the circuit illustrated in FIG. 8 to disable the inverter in response to operation of the load presence sensing circuit only in valleys of the ripple d.c. where the voltage, although positive, is at an instantaneous minimum. This function, which will be referred to as zero voltage turn-off, serves to limit transients by shutting down the inverter only when the supplied voltage, and therefore the energy within the inverter, is at a minimum.

In order to limit transients by means set forth above, it is necessary to modify the circuit of FIG. 4 by eliminating the clamp circuit, and substituting therefore the zero voltage turn-off circuit. Referring first to FIG. 4, it is recalled that the clamp circuit comprises transistor 230, SCR 231, clamping capacitor 234, and their associated components. Such components are replaced in FIG. 8 by lower power, less costly circuit elements comprising the zero voltage turn-off circuit.

Turning now to FIG. 8, it is seen that certain of the elements of FIG. 4 are included for demonstrating the operation of the zero voltage turn-off circuit. Flip-flop 216 which, as described above, is clocked into its set condition to disable the gate pulse generator is shown with outputs labeled 224, 225, 245 illustrating that, just as in the FIG. 4 embodiment, connections are made to transistor 224, capacitor 225 and SCR 245 respectively. Similarly, the clock input of the flip-flop 216 is driven by comparator 212, and the data input is coupled to the positive supply of voltage as illustrated.

The remaining components, which form one embodiment of a zero turn-off circuit, include a transistor 240 and its biasing resistors adapted to be turned on by the flip-flop 216, in a manner similar to that described with respect to transistor 230. A further similarity resides in the fact that the collector of transistor 270 is coupled through current limiting resistors 271, 273 to the gate of SCR 272. However, two major differences exist at this point. First, the SCR 272 is a signal SCR of much lower power rating than SCR 231 of FIG. 4. Secondly, the gate of the SCR 272 is additionally coupled in a disabling circuit controlled by a transistor 274. A final difference resides in the connection of the anode and cathode of the SCR 272. Whereas the clamping SCR in FIG. 4 is adapted to clamp a large capacitor across the inverter when conducting, the SCR 272 in FIG. 8 is adapted to couple the high signal produced at the Q output of flip-flop 216 to the associated disabling input of the gate pulse generator (FIG. 3). The SCR 272 may be an additional component, or may replace diode 148 shown in FIG. 3.

Neglecting for the moment the circuitry adapted to inhibit the gate of the SCR 272, it is seen that when the load sensing circuit is activated, the flip-flop 216 is clocked, driving its Q output high. As the $\overline{Q}$ output is driven low, transistor 270 is caused to conduct providing current to the gate of SCR 272. Accordingly, the high signal produced at the Q output of the flip-flop causes current flow to the base of transistor 147 (FIG. 3) causing it to conduct and disable the gate pulse generator 140.

Without the circuits coupled in disabling relationship to the gate of SCR 272, the gate pulse generator 140 would be inhibited immediately upon the load sensing circuit detecting an improper load. In order to produce a delay period between the detection of an improper load and the next valley in the ripple d.c., the transistor 274 has its base coupled via current limiting resistors 275 and 276 to a source of ripple d.c. in phase with the inverter supply. Such ripple d.c. may advantageously be derived from the low voltage d.c. supply 102, at the output of the full wave rectifier contained therein but before the regulator section. It will be appreciated that such a connection causes transistor 274 to conduct at all times except in the valley of the ripple. Realizing that whenever transistor 274 is conducting the gate of SCR 272 is disabled, it is seen that the SCR 272 will be allowed to be triggered by current flow through transistor 270 only in the valley of the ripple.

As a further feature of the illustrated zero voltage turn-off circuit, means are provided for preventing operation of such circuit when the inverter is re-enabled by the checking circuit. It is recalled that after the utensil presence detection circuit causes the inverter to shut down, a checking circuit periodically re-enable the inverter to check for a proper load. It is preferable that the zero voltage portion of the turn-off circuit be inoperative during such conditions so that the inverter will be shut down immediately if a proper load is not sensed before large amounts of energy are transferred to the inverter. To that end, a timing circuit comprised of resistor 280 and capacitor 281 is adapted to begin charging whenever transistor 270 is caused to conduct. A resistor 282 and threshold device such as zener diode 283 couple the voltage stored on capacitor 281 to the base of the transistor 284. Accordingly, when the voltage on capacitor 281 exceeds the breakover voltage of the zener diode 283 the transistor 284 will be caused to conduct, sinking the current provided by the ripple d.c. source. Transistor 274 is thus maintained in a cut-off condition allowing the SCR 272 to immediately respond to current flow through transistor 270. It will be appreciated that transistor 270 briefly turns off when the checking circuit re-enables the inverter, and is immediately turned back on if a proper load is not sensed. The SCR 272 may immediately respond to the subsequent turn-on as the charge on capacitor 281 maintains transistor 284 conducting during the brief period during which the inverter is enabled.

In summary, the circuit illustrated in FIG. 8 limits potentially damaging transients by disabling the inverter in response to the load sensing circuit in the next valley of the ripple immediately following the detection of a no load or improper load condition. However, when the inverter is subsequently periodically re-enabled by the checking circuit, the turn-off circuit is adapted to immediately disable the inverter before large amounts of energy are supplied thereto, such action continuing until a proper load is detected and normal operation resumed.

According to another feature of the protection circuit 106, means are provided for disabling the gate pulse generator in response to inverter circuit conditions which indicate that the utensil load, although proper, tends to draw power in excess of the component ratings. For example, certain uncommon, but known, types of utensils may be utilized which tend to draw more power than the normally encountered types of utensils. The circuit also protects against excessive power draw and the directly proportional increased anode voltage and current which might result from high line voltage, high trigger frequency, or other circuit misadjustments. Without this high power limit circuit, the excessive SCR current might cause the SCR to overheat and/or fail to commutate and the peak anode voltage, occurring just before the initiation of a conductive cycle, may rise to levels exceeding the ratings of the SCR. To prevent this occurrence, a high voltage limit circuit is provided for disabling the inverter in the event that inverter voltages approach the rated voltage of the power SCR. To that end a sensing circuit including resistor 240, variable resistor 241 and capacitor 242 are coupled across the SCR as shown. The junction between resistors 240 and 241 is coupled to the base of a transistor 243 arranged as an emitter follower in the low voltage control circuit. For establishing the threshold level above which the high voltage limit circuit will be actuated, a zener diode 244 is coupled between the emitter of transistor 243 and the gate of an SCR 245. Accordingly, when the voltage sensed at the junction of resistors 240 and 241 (as adjusted by resistor 241) causes the emitter of transistor 243 to exceed the breakover voltage of the zener diode 244, the SCR 245 will be gated on. SCR 245 will latch into conduction because of the d.c. current flow through anode resistor 246 and cathode resistor 247. The increased voltage at the cathode of SCR 245 will be applied to the set input of flip-flop 216, thereby locking the flip-flop into its set condition and maintaining the Q output thereof high to disable the gate pulse generator. Although the checking circuit will be allowed to oscillate under this condition, as the SCR 245 is latched by the d.c. potential of the low voltage power supply, the flip-flop will be maintained in its set condition. In order to reinitiate operation of the inverter, it will be necessary for the user to operate the power switch 70 in order to unlatch the SCR 245. This latched disabling condition is a signal to the user that the selected power setting is too high for the utensil in question, and thereby informs him to reduce the power setting.

It will be appreciated that as the high voltage limit circuit described above responds to peak anode voltage, the circuit may be driven directly from capacitor 210. While this would simplify the circuit by eliminating resistors 240, 241, capacitor 242 and transistor 243, the illustrated configuration is preferred, because it allows independent adjustment of the load sensing circuit and the high voltage limit circuit.

It will be appreciated from the foregoing that the improved inverter protection circuit simply disables the inverter whenever conditions are sensed which are undesirable or which might prove destructive. An important user oriented feature associated with such a circuit is an indication of actual inverter operation. It will be appreciated that while a pilot light indicator might be provided, responsive, for example, to the output of the high power rectifier 80, such light would be energized whenever power is applied to the circuit, irrespective of whether or not the inverter were operating. A neon lamp, coupled in the inverter circuit itself, would indicate actual inverter operation, but would be objectionable in that it would emit high frequency interference.

Figure 5:
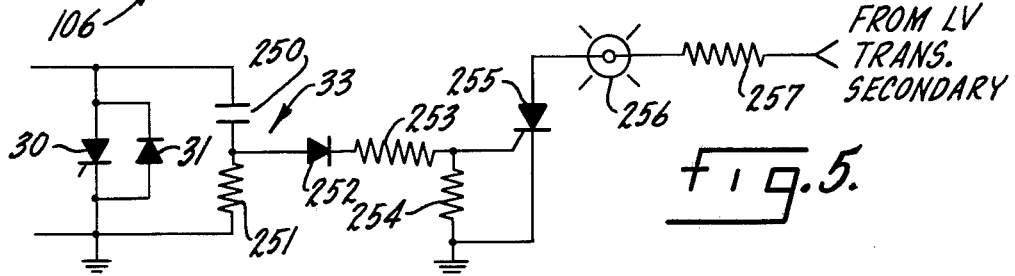
FIG. 5 is a schematic diagram illustrating an improved pilot light circuit.

In accordance with one aspect of the invention, a pilot light circuit is provided which responds to a minute quantity of high frequency energy tapped from the inverter circuit to energize a pilot light coupled in a low voltage circuit. Referring to FIG. 5, there is shown a portion of the inverter circuit including SCR 30, inverse parallel diode 31, and the snubber circuit 33. As shown, the snubber circuit 33 is comprised of a serially connected capacitor 250 and resistor 251. Whenever the inverter circuit is actually operating a voltage will appear across the resistor 251. For withdrawing a small amount of the energy from the inverter circuit, a voltage divider including resistors 253 and 254 is coupled via an isolating diode 252 across the snubber resistor 251. The junction between resistors 253 and 254 is coupled to the gate of a small signal SCR 255. Connected in the anode circuit of the SCR 255 is a low voltage indicator light 256 and current limiting resistor 257 driven from a low voltage source, which is preferably the secondary of the low voltage transformer within the low voltage d.c. supply 102. Accordingly, whenever the inverter circuit is in actual operation, the small amount of energy withdrawn by the voltage divider triggers the SCR 255 to illuminate the pilot light 256. The a.c. signal applied from the low voltage transformer secondary causes the commutation of the SCR 255 at the line voltage frequency, providing a reliable, interference free pilot light circuit.

Turning now to FIG. 2, the inhibit circuit, which is disclosed in detail in the above noted patent application, will be briefly described. It is seen that the inhibit circuit is coupled across the low voltage d.c. supply, and includes a transistor 120 connected as a common emitter switch. The collector of transistor 120 is coupled to the gate generator and is adapted to inhibit the gate generator when high. When the low voltage d.c. supply is energized, it begins to charge a capacitor 121 through a resistor 124. During the charging interval, the transistor 120 will remain in the off condition, causing the collector thereof to remain high, thereby inhibiting the gate pulse generator. However, when the voltage on capacitor 121 exceeds the breakover level of a Zener diode 122, the transistor 120 will be driven into conduction, to maintain the collector thereof at a low level thereby to enable the gate pulse generator.

Referring to FIG. 3, one form of gate pulse generator is illustrated for use with the above described inhibit circuit and protection circuits. The inhibit circuit is coupled via diode 149 to the base of a clamping transistor 147. Accordingly, whenever the inhibit circuit is generating its start-up delay period, the transistor 147 will be caused to conduct, thereby preventing the charging of a capacitor 142. The capacitor 142 forms an element of a conventional relaxation oscillator 140 which produces pulses at the intended operating frequency of the inverter, variable resistor 141 and capacitor 142 establishing such operating frequency. A pulse amplifier 145 is driven by the relaxation oscillator 140 to couple gating pulses via a current limiting resistor 146 to the gate of the power SCR. The protection circuits 106, and more particularly the Q output of the flip-flop 216 (FIG. 4), are coupled to the base of transistor 147 via diode 148. Accordingly, whenever the flip-flop is driven into its set condition, transistor 147 will be caused to conduct, thereby preventing the charging of capacitor 142 and the functioning of relaxation oscillator 140. As a result, inverter operation is inhibited until the flip-flop 216 is again reset.

It will now be apparent that what has been provided is an induction cooking appliance having a low voltage control circuit including protection circuits especially adapted for use in such appliance. The protection circuits utilize a single sensing circuit to detect an inverter circuit condition which is indicative of both an unloaded and an improperly loaded work coil. When an abnormal condition is detected, the inverter is completely disabled. Operating in conjunction with the load sensing circuit is a circuit adapted to limit potentially destructive transients which might be caused when the inverter is disabled. Such circuit may be adapted to dissipate the energy within the inverter circuit or alternatively to disable the inverter when the energy therein is at a minimum. The appliance includes a checking circuit for automatically re-energizing the disabled inverter at predetermined intervals to check for a proper load, allowing the appliance to operate in an automatic mode favored by potential users, while still adequately protecting the circuit components. For conserving energy, minimizing radiated EMI, and affording user protection by preventing the heating of unintended objects, the load sensing circuit is provided with means for varying the sensitivity thereof across the operating power level of the inverter. Accordingly, the protection circuits serve to shut the inverter down when improperly loaded, even if such improper loads will not cause a circuit failure. A final sensing circuit senses a condition wherein the utensil load, although compatible with the system, is incompatible with the level of power setting, and serves to shut the inverter down until the power setting is changed. Finally, a pilot light circuit is provided which is especially suited to the on-off inverter operation for informing the user of actual current flow in the inverter.

I claim as my invention:

1. An induction cooking appliance for use with metallic utensils comprising in combination, a solid state inverter circuit including a gate controlled thyristor for producing ultrasonic frequency current pulses in a work coil to generate an ultrasonic frequency magnetic field, a substantially non-metallic cooktop for supporting the metallic utensil over the work coil, said utensil serving as an inverter load, a d.c. power supply for energizing the inverter, means for selecting the operating power level of the inverter, and a protection circuit, said protection circuit including sensing means coupled to the inverter circuit for sensing a condition indicative of the nature of the inverter load, means for varying the sensitivity of the sensing means in accordance with the operating power level of the inverter, and means responsive to the sensing means for disabling the inverter in the absence of a proper inverter load.

2. The induction cooking appliance as set forth in claim 1 wherein the sensing means comprises a differentiating circuit coupled to the thyristor for sensing the magnitude of voltage transients appearing across said thyristor.

3. The induction cooking appliance as set forth in claim 1 further including means for periodically re-enabling the inverter, thereby to check for a proper inverter load.

4. The induction cooking appliance as set forth in claim 1 wherein the d.c. power supply produces a ripple d.c. voltage comprised of peaks and valleys, and the protection circuit includes a zero voltage turn-off circuit for sensing the valleys in the ripple d.c. voltage and delaying the operation of the disabling means until the next valley in the ripple d.c. voltage following the detection of the absence of a proper load.

5. The induction cooking appliance as set forth in claim 1 wherein the protection circuit includes means responsive to the peak voltage across the thyristor for disabling the inverter in response to levels of said peak voltage exceeding a predetermined maximum, thereby to limit the power produced by the inverter.

6. An induction cooking appliance for use with metallic utensils comprising in combination, a solid state inverter including a gate controlled thyristor for producing ultrasonic frequency current pulses in a work coil to generate an ultrasonic frequency magnetic field, a substantially non-metallic cooktop for supporting the metallic utensil over the work coil, said utensil serving as an inverter load, a d.c. power supply for energizing the inverter, means for selecting the operating power level of the inverter, and a protection circuit responsive to conditions within the inverter for inhibiting operation of the inverter in the absence of a proper inverter load, said protection circuit including means for producing a first signal proportional to the operating power level of the inverter, means for producing a second signal indicating the nature of the inverter load, and means for comparing the first and second signals to disable the inverter when said first and second signals assume a predetermined relationship indicating the absence of a proper inverter load.

7. An induction cooking appliance for use with metallic utensils comprising in combination, a solid state inverter circuit including a gate controlled thyristor for producing ultrasonic frequency current pulses in a work coil to generate an ultrasonic frequency magnetic field, a substantially non-metallic cooktop for supporting the metallic utensil over the work coil, a d.c. power supply for energizing the inverter, and a protection circuit responsive to conditions within the inverter circuit for inhibiting operation of the inverter, said protection circuit including means for producing a reference signal proportional to the operating power level of the inverter, means responsive to the rate of change of the voltage across the thyristor for producing a second signal, and means for comparing the reference and second signals for inhibiting operation of the inverter when the second signal exceeds the reference signal.

8. The induction cooking appliance as set forth in claim 7 wherein the means for producing the second signal includes a differentiator for responding to a sharply increasing thyristor voltage.

9. The induction cooking appliance as set forth in claim 7 further including means for periodically re-enabling the inverter after inverter operation is inhibited, thereby to periodically check conditions within the inverter circuit.

10. An induction cooking appliance for use with metallic utensils comprising in combination, a substantially non-metallic cooktop for supporting the metallic utensil, a work coil below the cooktop for coupling an ultrasonic frequency magnetic field to the utensil, a solid state inverter for producing the ultrasonic frequency magnetic field, a d.c. power supply for energizing the inverter, the inverter including the work coil, a commutating capacitor, a gate controlled power thyristor and an inversely poled parallel diode, the inverter being of the type turned on by a gate pulse provided to the gate of the thyristor and commutated by oscillating current flow between the work coil and the commutating capacitor thereby to allow the inverter to resume its forward blocking state, and an inverter control circuit, said control circuit including a gate pulse generator for providing gate pulses to the thyristor at an ultrasonic inverter operating frequency, means for producing a first signal proportional to the operating power level of the inverter, means for producing a second signal proportional to the instantaneous reapplied forward voltage across the thyristor, means for comparing the first and second signals and producing a disabling signal in the event said second signal exceeds said first signal, and means for coupling the disabling signal to the gate pulse generator for inhibiting the production of gate pulses whereby the inverter is protected from excessive levels of reapplied forward voltage.

11. An induction cooking appliance for use with metallic utensils comprising in combination, a substantially non-metallic cooktop for supporting the metallic utensil, a work coil below the cooktop for coupling an ultrasonic frequency magnetic field to the utensil, a solid state inverter including the work coil and a commutating capacitor for producing the ultrasonic frequency magnetic field, a.d.c. power supply for energizing the inverter, the inverter being driven by a gate controlled thyristor for initiating a bidirectional current pulse in the work coil, said thyristor being commutated by resonant current flow between the work coil and the commutating capacitor, the energy returned to the commutating capacitor by the resonant current flow serving to cause a forward voltage to be reapplied across the thyristor at the termination of the bidirectional current pulse, the magnitude and rate of rise of said reapplied voltage being related to the presence and type of utensil serving as a load for the work coil, a gate pulse generator for triggering the inverter at an ultrasonic operating frequency, first circuit means for producing a first signal proportional to the operating power level of the inverter, second circuit means for producing a second signal proportional to the instantaneous reapplied forward voltage across the thyristor, means for comparing the first and second signals and producing a disabling signal in the event said second signal exceeds said first signal, and means coupling the disabling signal to the gate pulse generator for disabling the gate pule generator.

12. The induction cooking appliance as set forth in claim 11 wherein the second circuit means includes a coupling capacitor for causing said second circuit means to respond to rapidly rising rates of reapplied forward voltage.

13. The induction cooking appliance as set forth in claim 11 further including timing means activated by the disabling signal for periodically re-enabling the gate pulse generator, thereby to check for application of a proper load.

14. The induction cooking appliance as set forth in claim 11 further including means responsive to the peak voltage across the thyristor for disabling the gate pulse generator in the event said level rises beyond a predetermined value, whereby the inverter is disabled in the event excessive power is drawn by the utensil load.

15. The induction cooking appliance as set forth in claim 11 wherein the d.c. power supply produces a ripple voltage comprised of peaks and valleys, said appliance further including a zero voltage turn-off-circuit for delaying the production of said disabling signal until the occurrence of a valley in the ripple d.c., thereby to disable the inverter when the energy therein is at a minimum.

16. An induction cooking appliance for use with metallic utensils comprising in combination, a solid state inverter circuit for producing ultrasonic frequency current pulses in a work coil to generate an ultrasonic frequency magnetic field, a substantially non-metallic cooktop for supporting the metallic utensil over the work coil, a d.c. power supply for energizing the inverter, an inverter control circuit includng a gate pulse generator, a pilot light circuit driven from a low voltage power supply, said pilot light circuit including means coupled to the inverter circuit for tapping an enabling current when the ultrasonic frequency current pulses are flowing in the inverter circuit, a pilot light and switch means coupled in the low voltage circuit, and means for coupling the enabling current to the switch means for illuminating the pilot light, whereby the illumination of the pilot light serves to indicate actual operation of the inverter.

17. The induction cooking appliance as set forth in claim 16 wherein the switch means is low powered gate controlled thyristor whereby the magnitude of the enabling current may be minimized.

18. The induction cooking appliance as set forth in claim 17 wherein the low power thyristor is an SCR adapted to be gated by said enabling current, the low voltage power supply having an a.c. output serving to commutate said low power thristor at the frequency of the power supply.

19. The induction cooking appliance as set forth in claim 16 wherein the inverter circuit includes a gate controlled power thyristor and a snubber circuit coupled across the power thyristor, the means for tapping an enabling current comprising a voltage divider coupled to the snubber circuit.

20. An induction cooking appliance for use with metallic utensils comprising in combination, a solid state inverter circuit including a gate controlled thyristor for producing ultrasonic frequency current pulses in a work coil to generate an ultrasonic frequency magnetic field, a substantially non-metallic cooktop for supporting the metallic utensil over the work coil, said utensil serving as an inverter load, a d.c. power supply for energizing the inverter, means for selecting the operating power level of the inverter, and a protection circuit, said protection circuit including load sensing means including a differentiator coupled to the inverter circuit and responsive to the reapplied forward voltage across said thyristor for detecting both no load and improper load conditions of the inverter, and means responsive to the load sensing means for disabling the inverter in the absence of a proper inverter load.

21. An induction cooking appliance for use with metallic utensils comprising in combination, a solid state inverter circuit including a gate controlled thyristor for producing ultrasonic frequency current pulses in a work coil to generate an ultrasonic frequency magnetic field, a substantially non-metallic cooktop for supporting the metallic utensil over the work coil, said utensil serving as an inverter load, a d.c. power supply for energizing the inverter, said d.c. power supply producing a ripple d.c. voltage comprised of peaks and valleys, means for selecting the operating power level of the inverter, and a protection circuit, said protection circuit including load sensing means including a differentiator coupled to the inverter circuit and responsive to the reapplied forward voltage across said thyristor for sensing a condition indicative of the nature of the inverter load, means responsive to the load sensing means for disabling the inverter in the absence of a proper inverter load, said disabling means including a zero voltage turn-off circuit for sensing the valleys in the ripple d.c. voltage and delaying the disabling of the inverter until the next valley in the ripple d.c. voltage following the detection of the absence of a proper load, and timer means for periodically re-enabling the inverter to check for a proper inverter load.

22. The induction cooking appliance as set forth in claim 21 including means for disabling the zero voltage turn-off circuit after the initial operation thereof so that the inverter disabling means may immediately respond to the inverter load when the inverter is re-enabled by the timer means.

23. An induction cooking appliance for use with metallic utensils comprising in combination, a solid state inverter circuit including a gate controlled thyristor for producing ultrasonic frequency current pulses in a work coil to generate an ultrasonic frequency magnetic field, a substantially non-metallic cooktop for supporting the metallic utensil over the work coil, said utensil serving as an inverter load, a d.c. power supply for energizing the inverter, means for selecting the operating power level of the inverter, and a protection circuit, said protection circuit including sensing means coupled to the inverter circuit for sensing a condition indicative of the amount of power drawn by the inverter load, and disabling means responsive to the sensing means for establishing a predetermined maximum power level and disabling the inverter in the event the amount of power drawn exceeds said predetermined maximum, said disabling means including latching means for latching the inverter in the disabled condition, and means responsive to a change in the operating power level selecting means for unlatching said latching means.

24. The induction cooking appliance as set forth in claim 23 wherein the condition indicative of the amount of power drawn by the inverter load is the peak thyristor anode voltage, said sensing circuit being responsive to levels of said peak anode voltage exceeding a predetermined maximum to disable the inverter.

25. An induction cooking appliance for use with metallic utensils comprising in combination, a solid state inverter circuit including a gate controlled thyristor for producing ultrasonic frequency current pulses in a work coil to generate an ultrasonic frequency magnetic field, a substantially non-metallic cooktop for supporting the metallic utensil over the work coil, said utensil serving as an inverter load, a d.c. power supply for energizing the inverter, said d.c. power supply producing a ripple d.c. voltage comprised of peaks and valleys, means for selecting the operating power level of the inverter, and a protection circuit, said protection circuit including sensing means coupled to the inverter load, means responsive to the sensing means for disabling the inverter in the absence of a proper inverter load, said disabling means including a zero voltage turn-off circuit for sensing the valleys in the ripple d.c. voltage and delaying the disabling of the inverter until the next valley in the ripple d.c. voltage following the detection of the absence of a proper load, checking circuit means for periodically re-enabling the inverter to check for a proper inverter load, and means for disabling the zero voltage turn-off circuit after the initial operation thereof so that the inverter disabling means may immediately respond to the inverter load when the inverter is re-enabled by the checking circuit means.

* * * * *